(12) United States Patent
Hall

(10) Patent No.: US 9,591,830 B2
(45) Date of Patent: Mar. 14, 2017

(54) BIT AND SYSTEM FOR FEEDING A VISCOUS AND/OR LIQUID SUBSTANCE INTO THE MOUTH OF AN ANIMAL

(76) Inventor: Heidi Hall, Cheyres (CH)

( * ) Notice: Subject to any disclaimer, the term of this patent is extended or adjusted under 35 U.S.C. 154(b) by 517 days.

(21) Appl. No.: 14/127,233

(22) PCT Filed: Jun. 22, 2012

(86) PCT No.: PCT/EP2012/062146
§ 371 (c)(1),
(2), (4) Date: Mar. 10, 2014

(87) PCT Pub. No.: WO2012/175710
PCT Pub. Date: Dec. 27, 2012

(65) Prior Publication Data
US 2014/0213965 A1    Jul. 31, 2014

(30) Foreign Application Priority Data
Jun. 24, 2011    (CH) ....................... 1072/11

(51) Int. Cl.
| | |
|---|---|
| A01K 13/00 | (2006.01) |
| A61D 7/00 | (2006.01) |
| B68B 1/06 | (2006.01) |
| B68B 1/04 | (2006.01) |

(52) U.S. Cl.
CPC .............. *A01K 13/003* (2013.01); *A61D 7/00* (2013.01); *B68B 1/06* (2013.01); *B68B 2001/044* (2013.01)

(58) Field of Classification Search
CPC .......... A01K 13/003; A61D 7/00; B68B 1/06; B68B 2001/044
See application file for complete search history.

(56) References Cited

U.S. PATENT DOCUMENTS

| | | | | |
|---|---|---|---|---|
| 4,535,724 A | * | 8/1985 | David .................... | A01K 15/02 119/712 |
| 5,128,518 A | * | 7/1992 | Reifel ...................... | B68B 9/00 219/220 |
| 5,557,905 A | * | 9/1996 | Harding .................. | A61D 7/00 119/833 |
| 5,566,645 A | * | 10/1996 | Cole ....................... | A01K 15/02 119/712 |
| 5,961,488 A | * | 10/1999 | Barak ............... | A61M 5/16827 604/246 |

(Continued)

FOREIGN PATENT DOCUMENTS

| | | |
|---|---|---|
| DE | 19500520 A1 | 7/1996 |
| FR | 2863162 A1 | 6/2005 |

(Continued)

OTHER PUBLICATIONS

International Search Report for PCT/EP2012/062746 dated Sep. 24, 2012.

*Primary Examiner* — Bradley Osinski
(74) *Attorney, Agent, or Firm* — Pearne & Gordon LLP

(57) ABSTRACT

Single or multiple jointed bit (1) with at least two mouthpieces (10), characterized by the fact that at least one mouthpiece (10) comprises at least one channel (100) which extends longitudinally with or without slope through this mouthpiece from one end to the other end, to enable the sending of a viscous and/or liquid substance (72) directly into the middle of the mouth of an animal (2) without changing the feeling in the animal's mouth or on its tongue (2).

22 Claims, 8 Drawing Sheets

(56) References Cited

U.S. PATENT DOCUMENTS

| | | | | |
|---|---|---|---|---|
| 2005/0234403 A1* | 10/2005 | Atkinson | ............ | A61M 5/1483 604/151 |
| 2007/0076401 A1 | 4/2007 | Carrez et al. | | |
| 2008/0077081 A1* | 3/2008 | Mounce | .............. | A61M 5/1413 604/67 |

FOREIGN PATENT DOCUMENTS

| | | |
|---|---|---|
| GB | 2286324 A | 8/1995 |
| WO | 98/26652 A1 | 6/1998 |

\* cited by examiner

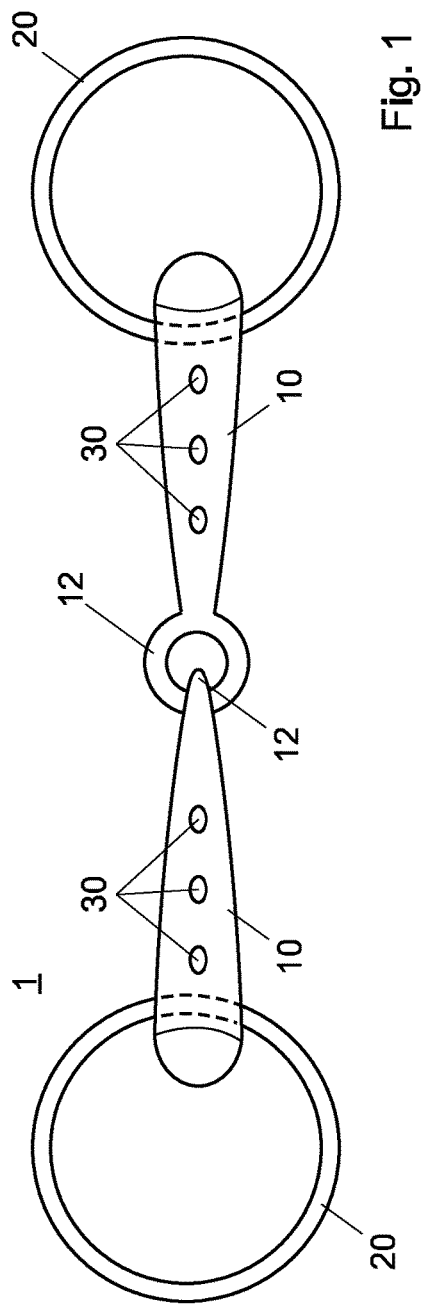
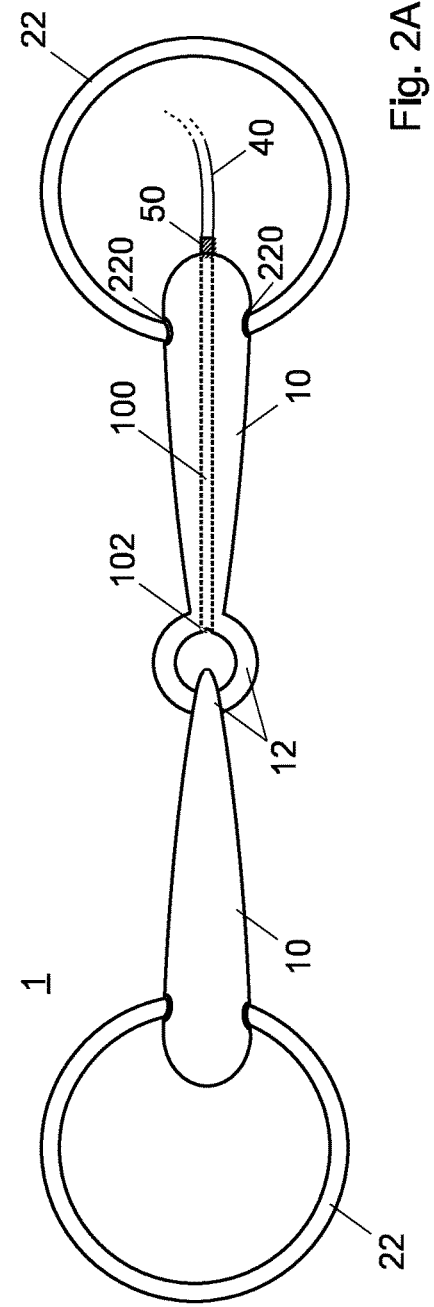

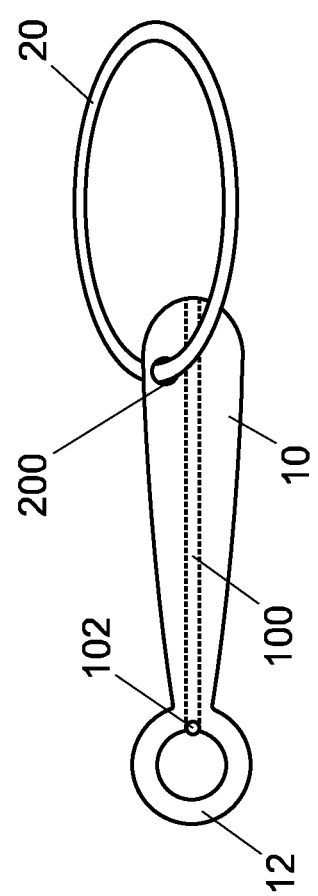

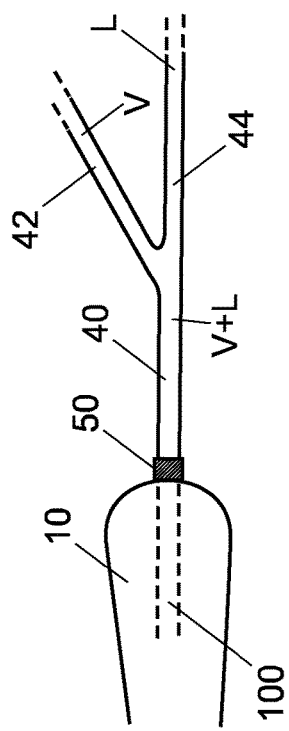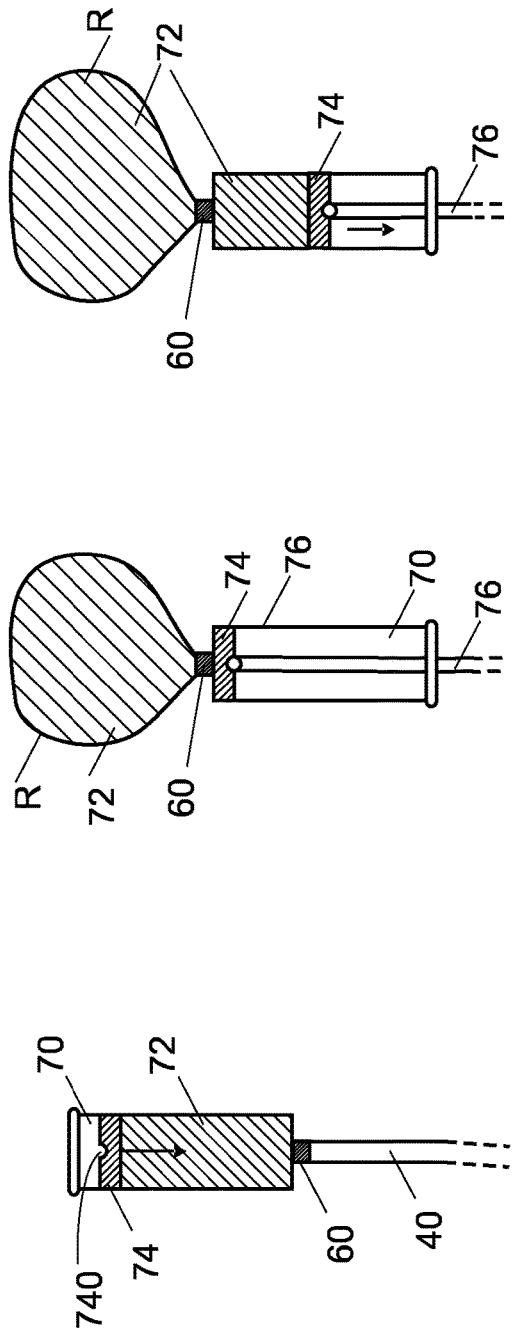

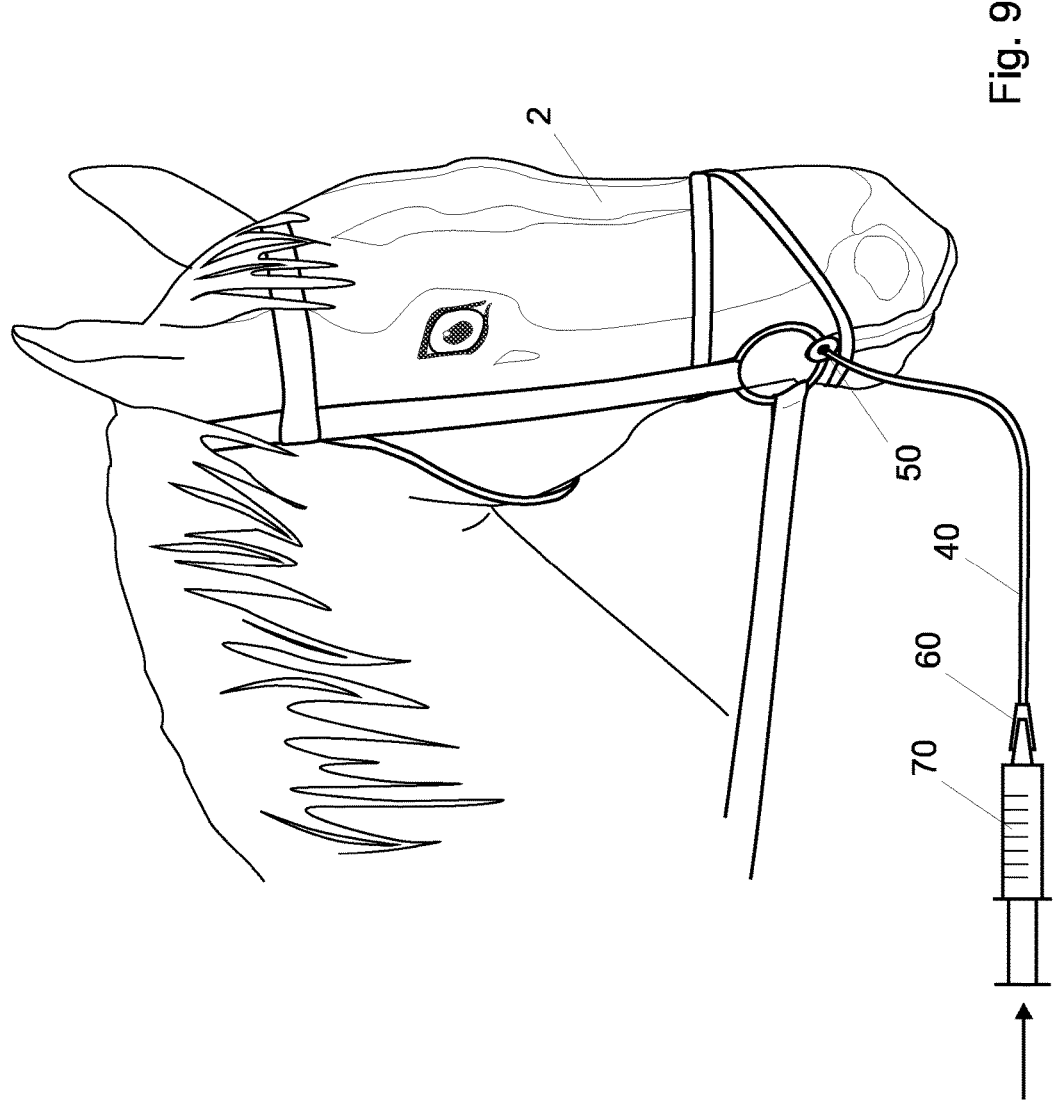

BIT AND SYSTEM FOR FEEDING A VISCOUS AND/OR LIQUID SUBSTANCE INTO THE MOUTH OF AN ANIMAL

FIELD OF THE INVENTION

The invention describes a bit and a system for feeding viscous and/or liquid substances into the mouth of an animal.

DESCRIPTION OF RELATED ART

A bit is a piece to be inserted into the mouth of an animal, for example a horse, to guide and to adjust its pace. Usually, it crosses the mouth over the tongue of the horse.

It is composed of one or more straight or curved parts called mouthpieces located in the mouth of the horse and of a bit ring on each side which is external to the mouth and fixed to the bridles. A jointed bit is compound of one, two or more mouthpieces. It may include one or several joints.

In this context the word "bridle" or "bridons" means a set of thongs made mostly of leather pieces placed on the head on the animal so as to maintain the bit in place. These thongs could comprise reins.

A bit can also be used for other purposes, for example to insert a substance into the mouth of a horse for different reasons: for example, a substance that allows to activate the salivation of a horse, to moisturize the mouth, to promote its chewing, to feed it, to treat it with drugs, to reward it, to make it accept the bit, etc. Generally, the substances used for those reasons are liquid or viscous like syrup, mashed mixture (puree) or paste.

Known bits contain hollow mouthpieces to send this substance inside the bit and one or more holes on the lateral and external surface of the mouthpieces which allow to send this substance in the horse's mouth. An example of one of these known bits is shown in FIG. 1.

However the presence of these holes on the outer surface of the mouthpieces involves several disadvantages: the contact of the horse's tongue with the surface of the mouthpiece obstructs the holes. In addition there is a risk of occlusion of these holes, for example by grass eaten by the horse. Finally, since these holes belong to the outer surface of the mouthpieces, they do not allow the sending of a substance directly in the middle of the horse's mouth, which would allow for a more effective diffusion of the substance in the horse mouth. In addition, if the holes are not properly mad, these holes may injure the mouth and/or the sensitive tongue of a horse.

Finally, the presence of these holes causes in the horse's mouth a different feeling from that caused by a bit that do not allow the injection of substances in its mouth and which has the mouthpieces' surface smooth: the horse can then be irritated by this new feeling and may not accept medicines sent into its mouth by known bits or have a strong reactions, which can be dangerous for the rider.

The document FR2752417 describes a hollow bit intended for the insertion of an aromatic component in forms of tablets placed in the hollow mouthpieces and closed by a cap. Four holes of 2 mm of diameter placed on the upper part of the bit enable tablets to diffuse into the horse's mouth.

The document GB190704027 describes another hollow bit so as to insert inside a pipe of liquid which diffuses through holes into the mouth of the horse.

Document DE2404007 describes a bit comprising holes allowing administration of a drug or a food.

Known bits furthermore request the rider who wants to send a substance inside the horse's mouth to dismount to inject the substance in the bit with a syringe as shown in the documents WO10105309, WO05117745, US2001032444, WO9206651, or with a piston as described in the documents U.S. Pat. No. 5,557,905 and U.S. Pat. No. 4,040,422.

The document DE940040U describes a hollow bit with holes on the exterior surface of the mouthpieces, and connected to a feeding pipe and to a reservoir containing a sugar solution or a medication. The rider can press on the ball-shaped reservoir to send a dose of liquid to the horse. The reservoir is positioned close to the saddle so that the rider can activate it without having to dismount. However, he must remove at least one of his hands from reins to press on the reservoir which can be dangerous. Additionally, the pressure must be applied by the rider almost continuously and with some energy at least for a while to send enough substance in the horse's mouth, and this can reduce the concentration and the rider's forces. Furthermore, the rider has to keep in mind to press from time to time on the reservoir.

U.S. Pat. No. 5,566,645 describes a bit and a system to send a substance into the mouth of a horse comprising a reservoir connected to the body of a rider by a belt, a pipe connected to a valve to adjust the flow of the substance, the valve being connected via another pipe to a mouthpiece of the bit. The mouthpiece comprises a channel ending with a first opening connected to the pipe and another opening for outputting the substance into the horse's mouth. Once again, the last opening belongs to the outer side surface of the mouthpiece, as the holes of FIG. 1.

GB135448 describes a hollow bit adapted to contain containers for medical drugs so as to send in the mouth of a horse drugs through holes using springs. The openings belong to the outer side surface of the mouthpiece as the holes of FIG. 1.

US20110061349 describes a bit and system to send a substance in the mouth of a horse comprising a reservoir made of two bags placed on the horse's back and a pump allowing the sending of a substance in the horse's mouth through a pipe connected to the bit. The bit does not comprise any opening but it is connected via removable means to an external pipe along its outer surface.

There is therefore a need for a bit and a system for sending a viscous and/or liquid substance into the mouth of an animal to reduce or at least avoid one of the disadvantages of the aforementioned known bits.

BRIEF SUMMARY OF THE INVENTION

An aim of the present invention is to provide a bit exempt of limitations of known bits.

Another is to propose a bit that allows to reduce or cancel the risk of hurting the horse's mouth.

Another aim is to propose a bit that can send a substance directly in the middle of the mouth of the horse.

Another aim is providing a bit that allows the horse to have in its mouth the same feeling as a conventional bit.

Another aim of the invention is to provide a system for sending a viscous and/or liquid substance into the horse's mouth without forcing the rider to descend from the horse, and/or reduce his/her concentration and strengths.

According to the invention, these objects are achieved in particular by means of a bit according to claim 1 and by means of a system for sending a viscous and/or liquid substance into the mouth of an animal according to claim 7.

The bit according to the invention comprises at least two mouthpieces, whereas at least one mouthpiece contains a channel extending longitudinally from one end to the other end of the mouthpiece. The presence of this channel allows sending a viscous and/or liquid substance and/or mashed mixture directly in the middle of the mouth of an animal.

Furthermore, thanks to the presence of this channel, the holes on the outer side surface of the mouthpieces are no longer necessary. The outer lateral surface of the mouthpieces can be smooth, without interruptions, which completely cancels the risk of hurting the horse's mouth.

The presence of the channel extending longitudinally through at least one end of a mouthpiece to the other end advantageously allows the sending of a substance directly in the middle of the horse's mouth, which facilitates a more efficient and balanced distribution of the substance in the horse's mouth.

Furthermore, the lack of holes on the lateral surfaces allows to avoid the risk of their occlusion when the horse eats; the tongue of the horse cannot obstruct the exit of substances. The absence of holes also allows the horse to have the same sensation in its mouth as with a conventional bit.

The bit according to the invention can be single or double jointed. It may also be an eggbutt bit In one embodiment the channel(s) which cross the mouthpiece from one end to the other one of a mouthpiece are substantially horizontal, i.e. substantially parallel to the main direction of the mouthpiece, or in other words to the direction corresponding to its length. In this context the adverb "substantially" indicates that small tolerances, for example in relation to the measurement of the angle, may be accepted.

In another embodiment, the channel(s) that crosses through the mouthpiece from one end to the other forms an angle with the horizontal direction as defined above: for example, a channel may form with the horizontal direction an angle whose amplitude is preferably less than 20°, e.g. 10°. In fact a real mouthpiece often has a slightly curved shape. Moreover, at its central part it comprises a horizontal metal bar, and manufacturing a substantially horizontal mouthpiece at this bar may complicate the manufacture of the bit according to the invention and would provide a less robust bit. In this embodiment the channel, even if inclined, always crosses the mouthpiece from one end to the other one, and allows to send a substance directly in the middle of the horse's mouth, as its position in correspondence of the end of the mouthpiece in the horse's mouth is unchanged with regard to the variant with a substantially horizontal channel.

The bit according to the invention does not alter the feeling that the horse has in its mouth with the contact with the bit when compared to a smooth bit and especially on its tongue, as the extremity of the channels arrives at the joints and is not in contact with the mouth and/or the delicate tongue of the horse.

Therefore, there is no change in the horse's or rider's habits, who then can use the bit as both conventionally or with the channel(s). The channel (s) allow(s) the rider to safely send oral medications and/or to passively activate the salivation of the horse and/or reward the horse actively and extemporaneously.

According to an independent aspect of the invention the bit is arranged to be connected to a reservoir of a viscous and/or liquid substance through a pipe, the connection between the bit and the pipe and/or between the pipe and the reservoir being "non-standard". In this context the expression "non-standard connection" designates a proprietary connection that allows to connect the bit and/or the reservoir to a single type of pipe and prevents the bit and/or the reservoir can be connected to any other pipe. For example, this connection can be of the male-female type, with a locking system, for example a screw system, with sizes, shape and thread different from known sizes, shapes and threads. An example of this connection is described in the document of Vygon EP1689343.

The bit according to the invention is "multipurpose" as it allows the rider to choose between different functions: the rider can indeed choose a single utilization bit (smooth mouthpieces which do not change the classical use of the bit—the sensation in the horse's mouth remains the same), use the bit to activate the salivation, use it to reward the horse while on horseback, or both. The use of this bit also allows a young horse to get used to the bit. It also allows for a facilitated oral administration of drugs and substances beneficial for the animal.

The bit according to the invention can be used in a passive manner, which means that there is no direct intervention of the rider required for example to activate the salivation of the horse in a pleasant manner for a period roughly corresponding to a working session; it can also be used passively or actively by the rider in the saddle to instantly reward his horse. The bit according to the invention makes it possible to choose the channel of one of the two mouthpieces, for example to reward the horse. To do this, the rider can fix a bag, for example a flexible bag containing a pasty substance, such as viscous puree on the cheek part of the reins, the bag being connected to the bit through a pipe to distribute a quantity of paste or puree that is pleasant for the horse as a reward.

In addition, this bit allows for a safe treatment of the animal with oral medications injected directly into the middle of the horse's mouth, which are more easily accepted as the mouthpieces are smooth and as the horse is accustomed to accept this type of bit; furthermore, it is also possible to use a long enough extension pipe in order to keep the individual who administers the substance safe from a sudden movement of the horse's head. This allows for a distancing of the man from the horse by protecting him from possible sudden reactions of the horse.

The breaking in of young horses with this type of bit will lead to a faster and better acceptance of the bit.

If the bit according to the invention is not connected to a reservoir and/or it is not used, its channel can be filled with a lockable rod conforming to the shape of the channel. In another embodiment the rod can also be used to clean the channel.

The invention also relates to a system for sending viscous and/or liquid substances in the mouth of an animal comprising a bit comprising at least two mouthpieces, at least one mouthpiece comprising a channel extending longitudinally the mouthpiece there through from one end to the other one one or more reservoirs, such as a syringe and a bag with these viscous/liquid substances one or more pipes between the bit and the reservoirs.

According to another independent aspect of the invention the system also includes means to automatically apply pressure on the reservoir of a viscous and/or liquid substance, to send this substance. In this context the adverb "automatically" means without the actions of the user, except for the initial action to activate or start these means.

These means may comprise a metal piece in the reservoir, such as a syringe with a piston that moves under the effect of its own weight. These means may alternatively comprise an elastically compressible element in the reservoir, for example and without limitation a spring and/or gas and/or silicone. A command mechanical, electromechanical or with an electronic module can also be used to control and cause the release of the substance through the bit, for example by controlling a pump powered by a battery.

In this way the rider should only activate these means, e.g. unlock the metal piece and the substance will be automatically sent to the horse's mouth without any further action of the rider. In a preferred embodiment this activation can be performed by the rider without descending from the horse. For example, the syringe comprising the metal piece or a gas cartridge, a spring, etc., can be fixed to a strap available to the rider without having to dismount.

In the case of passive use by the user the reservoir, for example a bag or a syringe, preferably comprises a liquid substance. In one embodiment this reservoir sends the liquid substance by gravity continuously in the horse's mouth. The reservoir is connected to a pipe which is fixed to the bit according to the invention. In a variant, this pipe is equipped with a clamp or any other means that after the connection can stop the flow if the rider does not ride a horse right away. In a variant, the reservoir is a single use reservoir.

In another variant it is fixed to the bridle exceeding the front towards the mouth with a fastening button, or any other removable fastening system, and this can be done on either one or both sides.

In another variant the bit according to the invention can be used actively, i.e. with direct intervention of the rider, for example to instantly reward the horse. In this variant the reservoir of a substance like puree can be a flexible bag which is connected to the bit through a first pipe. This bag can be directly reachable by the rider or can be connected to a pump reachable to the rider through a second pipe. In a preferred variant the rider will push the substance into the horse's mouth for rewarding it when he/she wants by acting directly on the flexible bag or by sending air in this bag through the pump and the second pipe. The latter may be equipped with a non-return valve so that the injected air inflates the double-sheeted flexible bag. Of course, any system having the final aim to send the substance in the horse's mouth in an active way by the rider may be used by a skilled person.

The second pipe can be fitted on the reins on the side that best suits the rider who can then at any time send air into the double-sheeted bag which releases the substance in the horse's mouth or activate a system that sends one dose reward in the horse's mouth.

In another variant the pump for pushing air into the flexible bag to send the puree into the horse's mouth is integrated into a stick or handle which the rider can hold in his hand. The stick or handle may include a strap. In a variant it has a length smaller than 15 cm, for example within 5 and 10 cm. It is connected to a pipe that has enough gap to allow the rider to move his/her hands forward or backward on the reins. This pipe can be fixed on the rein by the rider, according to its type of ride and according to the size of the bridle.

In this case the rider has the same feeling of holding a whip or a stick, however, but for rewarding the horse. The rider may press the base of the stick or handle which sends an amount of air to the flexible bag to force the substance into the mouth of the horse. In another variant, the rider can send a signal to send the substance in the horse's mouth by pressing the stick. In another variant, the same stick includes the reservoir of puree substance and rider can send this substance in the horse's mouth by simply pressing the stick.

In another variant, the stick is mounted as an extension of a stick or a whip, for example by screwing it onto the stick or by connecting it to the stick by other means of connections, for example and without limitation through a system of clip, magnets, etc.

In another variant, the stick has a light and compact system which allows for easily fixing it on the reins if the rider does not want to use it anymore for example with a notch or a magnetic part.

In another independent aspect of the invention, the bit of the invention or any other bits can be preheated in a heating box to be more easily accepted by the horse. The bits are generally metallic and hence can be very cold for a horse, especially in winter.

Advantageously, this heater box can be in the form of the bit. In a variant, it is provided with a switch which triggers the heating during the preparation of the horse. The heating can be obtained, for example and in a non-limiting way, via a resistor heating. In another variant, the heating is triggered when the rider puts the bit in the box. In another variant, the box holds two or more bits. In another variant, the case is washable and can be equipped with wipes, for example, paper wipes, or any other means to keep the bit clean and dry.

BRIEF DESCRIPTION OF THE DRAWINGS

Examples of implementation of the invention are specified in the description illustrated by the attached figures in which:

FIG. 1 shows a view of an example of a known bit comprising two mouthpieces.

FIG. 2A illustrates a view of an embodiment of a single jointed bit according to the invention.

FIG. 3 shows a view of another embodiment of a mouthpiece of a bit according to the invention.

FIG. 5 illustrates a view of an embodiment of the Y-shaped piece that allows to send a liquid substance in the bit according to the invention, mixed with a viscous substance.

FIG. 6A-6C illustrate the steps to refill the reservoir of the system according to the invention.

FIG. 9 illustrate a possible veterinary use of an embodiment of the bit according to the invention.

DETAILED DESCRIPTION OF POSSIBLE EMBODIMENTS OF THE INVENTION

Figure 2B:
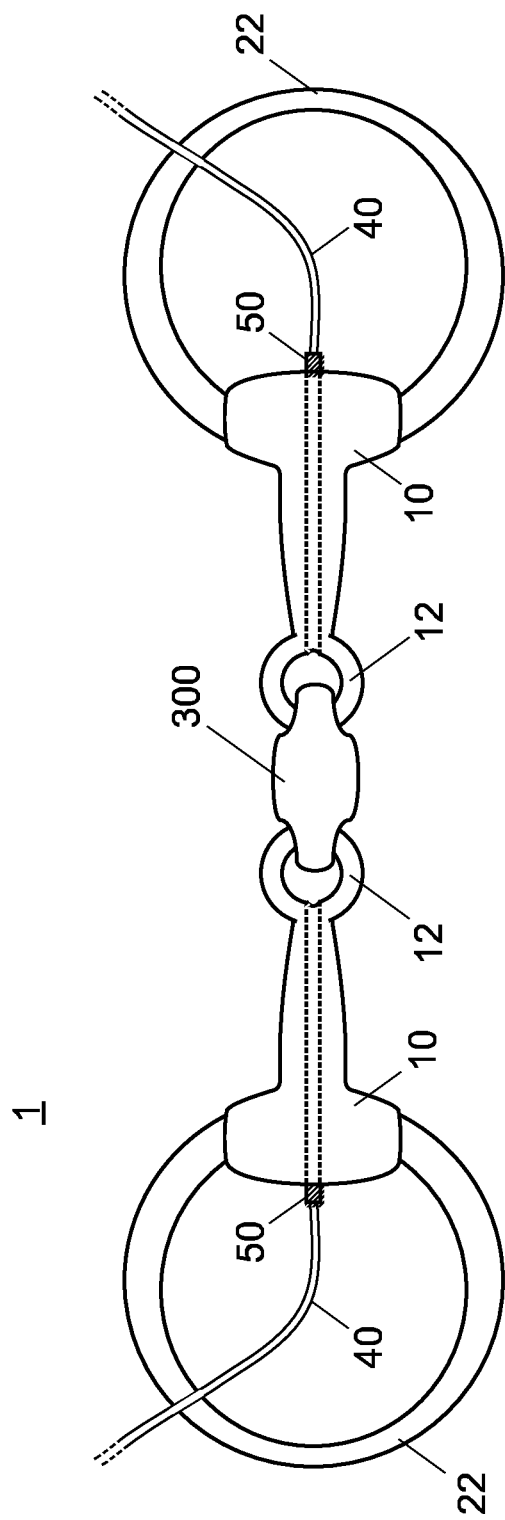
FIG. 2B illustrates a view of an embodiment of a double jointed bit according to the invention.

FIG. 2A illustrates a view of an embodiment of a bit 1 according to the invention, which in this example is a single jointed bit comprising two mouthpieces 10, the invention being also applicable to bits with three or more mouthpieces 10 and more joints. Each mouthpiece 10 is substantially linear and comprises two ends. One end of these, in particular the end corresponding to the reference 12, is ring-shaped and is connected to the corresponding end of the other mouthpiece so that the two mouthpieces could be articulated relative to each other, i.e. they can be moved relative to each other.

Unlike a known bit, an example of which is illustrated in FIG. 1, at least one mouthpiece 10 of the bit 1 of the invention comprises a channel 100 extending longitudinally through the mouthpiece 10 from one end to the other end, for sending viscous and/or liquid and/or puree substance not illustrated directly in the middle of the mouth of an animal, e.g. a horse. In FIG. 2A the mouthpiece 10 has this channel 100. Each channel 100 has in other words two ends which can correspond to the two ends of the mouthpiece 10, which allow the introduction of the substance in the bit 1 by the outer end of the mouthpiece 10 opposite to 12, and the expulsion via the end 12, i.e. directly in the middle of the horse's mouth, which makes the diffusion of this substance most effective because it is symmetrical with respect to the mouth.

Thanks to the presence of the channel 100, the holes 30 of the outer side surface of the mouthpieces 10, visible in FIG. 1, are no longer necessary. The outer lateral surface of the mouthpieces 10 may be smooth, without interruptions, which completely avoids the risk of hurting the horse's mouth and allow to do not change the feeling in the horse's mouth compared to a conventional bit with smooth mouthpieces. Additionally, the risk of occlusion of these holes 30 during the horse's eating is also avoided.

In a variant not shown each mouthpiece may have two channels, for example two parallel channels to each other, which extend longitudinally through the mouthpiece, or an arbitrary number of channels extending longitudinally through each mouthpiece.

In the variant illustrated the channel 100 through which crosses the mouthpiece 10 from one end to the other is approximately horizontal, i.e. approximately parallel to the direction of the mouthpiece 10 corresponding to its length.

In another variant not illustrated the channel(s) 100 which crosses the mouthpiece 10 from one end to the other form an angle with respect to the horizontal direction as defined above: for example a channel 100 can form with a horizontal direction an angle whose amplitude is preferably less than 20°, e.g. 10°. In fact a real mouthpiece 10 often has a slightly curved shape. Furthermore, it comprises at its central part a metallic horizontal bar and the creation of a mouthpiece 10 substantially horizontal near this bar could complicate the manufacturing of the bit according to the invention or could allow to have a less robust bit. In this variant the channel, even if tilted, always passes through the mouthpiece from one end to the other and allows to send a substance directly in the middle of the horse's mouth, as its position in regard of the end 12 of the mouthpiece which is in the mouth remains unchanged from the variant of a substantially horizontal channel in FIG. 2A.

In know bit the end of each mouthpiece opposed to 12 is usually connected to a ring 20, visible in FIG. 1, which is attached to the reins. This ring 20 can move and freely slide with regard to the mouthpiece.

In the example shown in FIG. 2A, each mouthpiece 10 is connected to a piece in the form of a circular arc 22 which do not pass through it, and thus avoiding to penetrate the channel 100. This part 22 is fixed, for example glued, screwed or welded to the mouthpiece 10. A shell 220 can also be provided in the mouthpiece 10 in correspondence with the point of fixation of the piece 22. This part 22 cannot slide in relation to the mouthpiece 10, and is thus in a substantially fixed position. However, this fixation does not prevent an efficient movement of the reins connected to this piece and thus neither affects the rider's control over the horse. A bit with fixed and ergonomic rings with corners of the horse's lips is called eggbutt. In this case it is also possible that the channel 100 has a bend so that the end different from 12 belongs to the side surface 10 of a mouthpiece.

The FIG. 2B illustrates a double jointed bit 1 including the central part or medallion 300.

In another variant, illustrated in FIG. 3, the mouthpiece 10 is connected to a ring-shaped piece 20 and the crossing it below or above the channel 100 in correspondence with a hole 200. In this case the part 20 can slide on the mouthpiece 10.

In a preferable variant each mouthpiece 10 of the bit 1 may include a notch 102, visible for example in FIGS. 2A and 3, which is at the end of the channel 100 near the end 12 of the mouthpiece for avoiding a possible occlusion of the channel 100 if the ends 12 of the two mouthpieces, which can move relative to each other, enter into contact. However, this possibility of occlusion is very low, the bit 1 being generally tense in the horse's mouth.

Figure 4A:
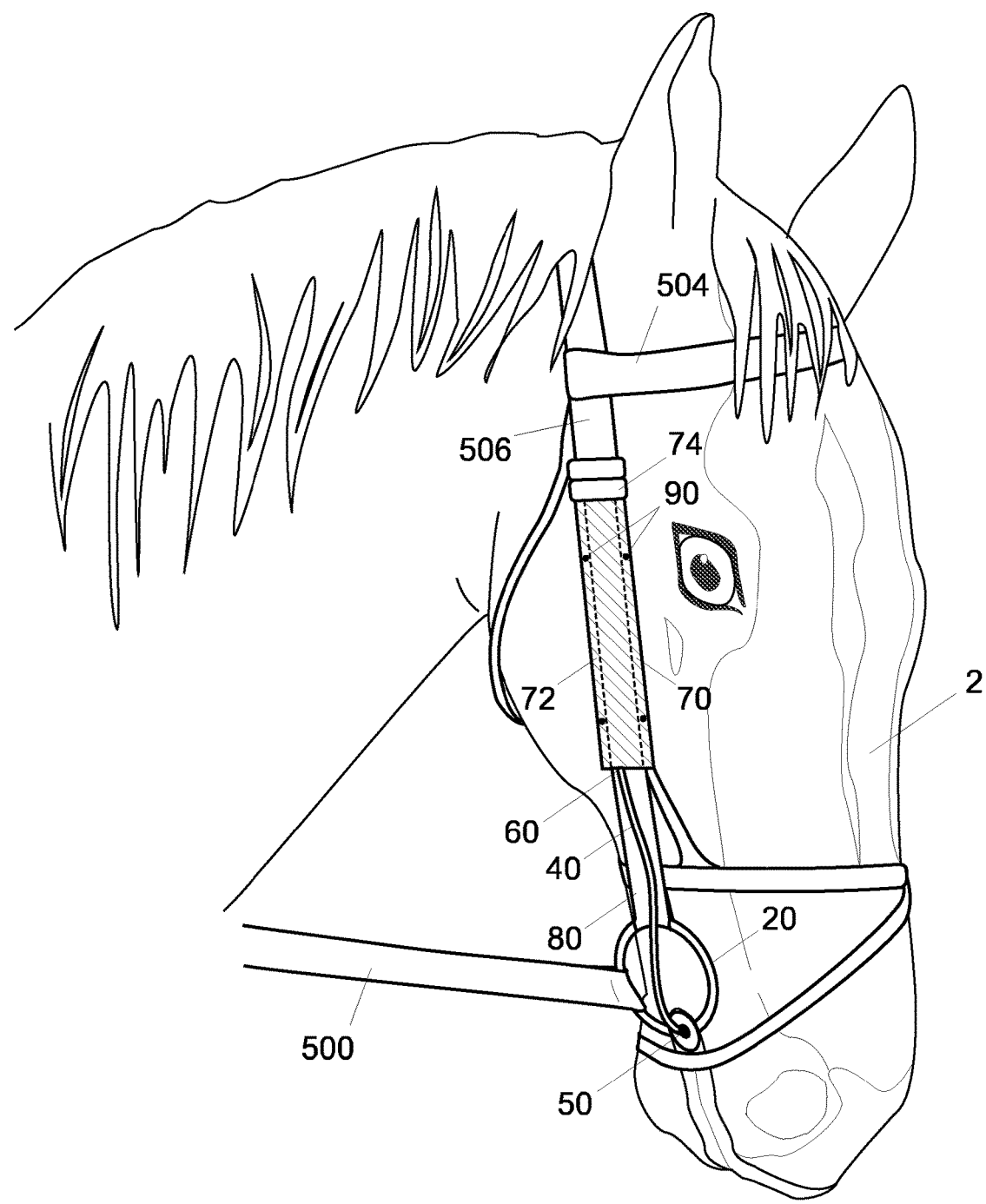
FIG. 4A illustrates a view of a horse to which an embodiment of the invention is attached to, so as to allow to send a liquid/viscous substance passively into its mouth.

In order to inject a substance, for example a medicament, a foam, a gel, a liquid acid or any another liquid and/or viscous substance, in the mouth of the horse, each mouthpiece 10 may be connected to a reservoir 70 of this substance through a pipe 40 as shown in the FIGS. 2A-4A, to which it is connected via a connection 50. Preferably, the pipe 40 is flexible. In another preferred variant, the pipe 40 is an extension pipe. In FIG. 4A the reservoir 70 is a syringe.

According to an independent aspect of the invention, the connection 50 between the bit 1 and the pipe 40 and/or the connection 60 between the pipe 40 and the reservoir 70 is non-standard, i.e. it is a proprietary connection allowing to connect the bit 1 and/or reservoir 70 with a single type of pipe 40 and which prevents the bit 1 and/or the reservoir 70 from being connected to any other pipe 40. For example the connection 50 and/or 60 may be of the male-female type, with a locking system, such as a fastening system, which has the sizes, shape and thread with dimensions different from known sizes, shapes and threads. An example of this connection is described in EP1689343 of Vygon.

In another variant the connection 50 between the bit 1 and the pipe 40 and/or the connection 60 between the pipe 40 and the reservoir 70 is standardized, e.g. an intra-venous luer lock. In another variant, the pipe 40 includes a Y shaped piece, visible in FIG. 5, in order to send two different substances from two different reservoirs into the bit 1. For example, a first reservoir may contain a liquid substance L and is connected to the pipe 42 of the Y-shaped connection and the second reservoir may contain a viscous substance V and is connected to the pipe 44 of the Y-shaped connection. In this way the two substances are mixed before being sent into the mouth of the animal. It is quite possible to provide three or more reservoirs and a piece capable of mixing their respective substances.

In another variant, it is possible to send two different substances from two different reservoirs through the two mouthpieces 10 into the bit 1, the first mouthpiece being used for a first substance, the second for a second substance. In this way it is possible to avoid the risk of occlusion of a channel if one of these two substances is viscous. A syringe 70, as an example, may be the reservoir, containing a liquid substance to enable the activation of the horse's salivation for a period corresponding roughly to a working session of the horse and the other reservoir may be for example a bag placed e.g. on the horse's head and connected to the bridles, containing a viscous substance to reward the horse. The sending of these substances in the horse's mouth can be automatic, i.e. without the direct and active involvement of the rider, or active, or both. In a preferred embodiment of the invention, the sending of the liquid substance for activating the salivation of the horse is passive, i.e. it do not need any action from the rider, and the sending of the viscous substance and/or puree to reward is active and therefore managed by the rider.

The mouthpieces 10 are made in at least one of the following materials: metal—e.g. nickel, stainless steel, brass, copper—rubber and synthetic materials—e.g. resins—plastic, alloy.

The invention also relates to a system for sending viscous and/or liquid substances in the mouth of an animal such as a horse, visible in an example in FIG. 4A, including
- A bit 1 as described
- One or more reservoirs 70, for example a syringe, containing viscous and/or liquid substances 72
- One or more pipes 40 between bit 1 and 70 reservoirs.

The reservoir 70, which may be rigid or flexible, is secured to the bridle 80 via a fixing means 90, such as clamps, adhesive or Velcro strips, magnetic elements, glue, screws inserted into the holes of the bridle 80 or another removable locking mechanism. In the example in FIG. 4A the syringe is attached to a strap on the cheek(s) of the horse, but it could also be attached to the strap between the horse's ears 2.

Figure 4B:
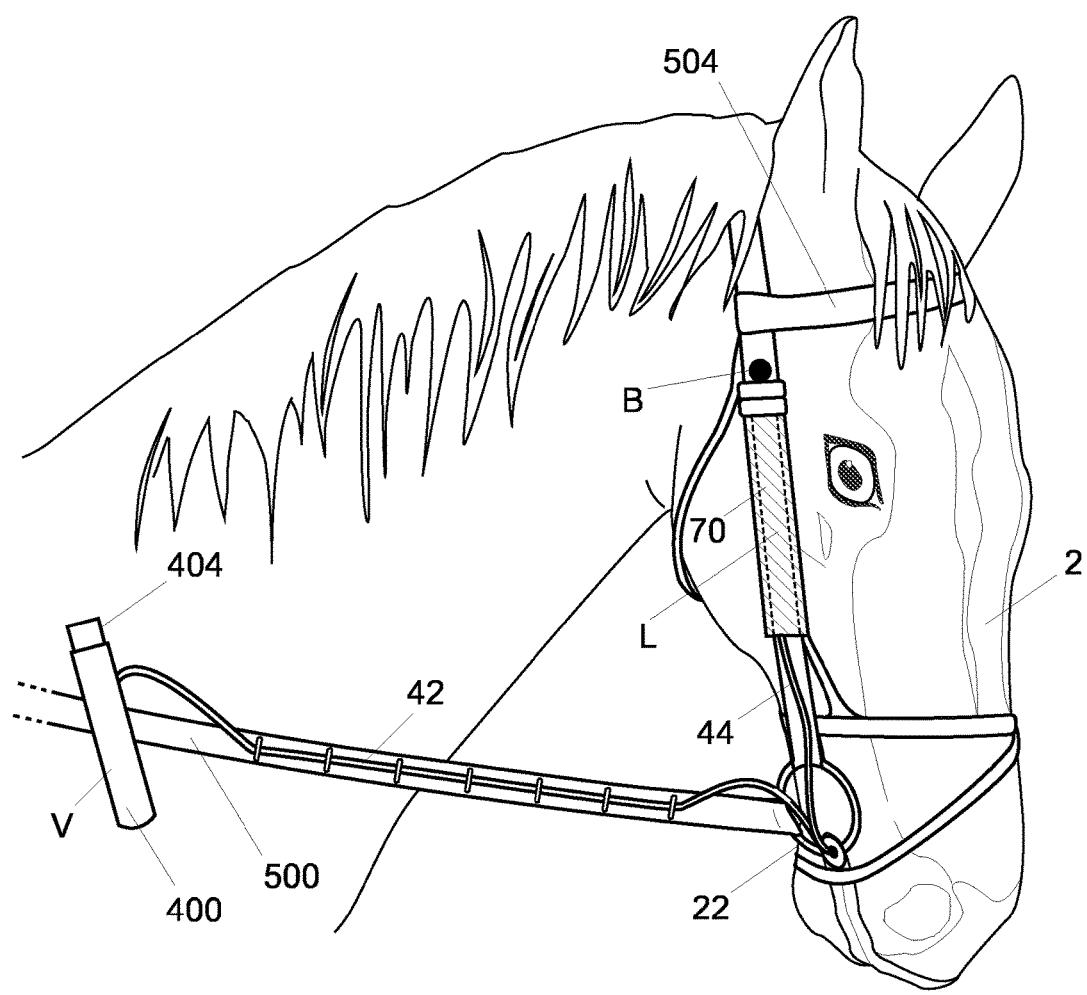
FIG. 4B illustrates a view of a horse to which an embodiment of the invention is attached to, so as to allow to send a liquid/viscous substance passively into its mouth and another embodiment of the system according to the invention, for sending viscous substances and/or puree actively into its mouth.

In the example of FIG. 4B a leather strap 504 is mounted and fixed to the headstrap and starts from both sides 506 for passing under the frontal junction headstrap-frontal. The part protruding toward the front to the mouth is provided with a not illustrated button or any other means for securing the bag or syringe 70 on one or on both sides of the bridle 506. In other words the bag or syringe 70 is attached to the part of the bridle 506 exceeding the headpart in direction of the mouth with a fastening button or any other removable fastening system and that on one of the two sides or on both sides.

In the variant where the bit according to the invention is used in the veterinary field, e.g. to send an oral drug substance in the horse's mouth, each ring 20 of the bit can be connected to an elastic that can pass behind the horse's ears or a strap that can be easily mounted on the head-collar to use the bit safely and quickly. FIG. 9 illustrates a possible veterinary use of the bit according to the invention, wherein a mouthpiece is connected through a pipe 40 to a syringe 70 which is not fixed to any strap, but the rider can use it directly in order to send a drug in the horse's mouth by pressing the tip of the syringe 70, as indicated by the arrow. Any other reservoir 70, such as a bag, can be used in this context.

According to another independent aspect of the invention, the system also includes means for automatically applying pressure to the reservoir 70 on the viscous and/or liquid substance 72 to send this substance in the mouth of the animal.

In the example illustrated in FIG. 4A these means comprise a metal piece 74 in the syringe 70, which can move under the effect of its own weight. Like this, the rider only has to unlock the metal piece, and the substance 72 will be sent automatically to the horse's mouth without any further action of the rider and the rider on the horseback because the syringe 70 is attached to a strap on the cheek of the horse, which is easily accessible by the rider.

The metal piece 74 has a weight which may depend on the viscosity of the substance 72: higher viscosity needs a heavier piece 74.

If the substance 72 is rather liquid, it could be moved under the effect of gravity. In this case, the syringe may be of "low resistance" type.

In a preferred variant, the reservoir 70 contains a liquid substance to activate the horse's salivation.

The means to automatically apply pressure to the reservoir 70 on the viscous and/or liquid substance 72 may alternatively include a resiliently compressible element in the reservoir 70, for example and without limitation a spring and/or gas and/or silicone. A mechanical command, with an electromechanical or electronic module, can also be used to control and cause the transmission of substance through the bit, for example by controlling a pump powered by a battery.

The syringe 70 may be a single use syringe. In another variant, it is not a single use syringe. In the latter case, as shown in FIG. 6A, when the metal piece 74 has reached the end of the syringe 70 connected through the connection 60 to the pipe 40, the pipe 40 is disconnected from the connection 60 and the syringe 70 is connected by the user to an external reservoir R of the substance 72 through a non-illustrated attachment system. The reservoir may have a roughly rectangular shape, for example that of an infusion bag. At this point the metal piece 74 can be moved by a user to the other end of the syringe 70: in the example shown in FIGS. 6A-6C, the metal piece 74 has a blind hole 740 which has a shape that allows it to being connected to the rounded end of a rod 76 that the user enters into the syringe. Once the rod 76 is locked on the piece 74, as shown in FIG. 6C, the user can move the rod 76 in the direction indicated by the arrow: the vacuum created will refill the syringe 70. Any other system that allows a user to move the piece 74 and thus refill the syringe 70 can be used.

In a variant, the pipe 40 has a clamp or any other means that after its application can stop the flow if the rider does not go straight to the horse. In a variant, the reservoir 70 is a single use device.

In another variant the bit described in the invention can be actively used, i.e. with the direct intervention of the rider, e.g. to instantly reward the horse. In this variant the reservoir of the substance can have the shape of a flexible bag connected with the bit 1 through a first pipe. This bag can be directly reachable by the rider or can be connected to a pump reachable by the rider through a second pipe.

In a preferred variant, the rider will inject the substance into the horse's mouth to reward it at any desired time by pushing directly on the flexible bag or blowing air into this bag with the substance through the pump and the second pipe. The latter may be equipped with a non return valve so as the injected air expands the double-sheeted flexible bag. Of course, any system with the ultimate goal of sending the substance in the horse's mouth in an active way may be considered by the skilled person.

The second pipe may be mounted on the side of the reins, which better suits the rider who therefore may at any time send air into the double-sheeted bag which pushes the substance in the horse's mouth or activates a system that sends a dose of reward into the horse's mouth.

In another variant, shown for example in FIG. 4B, the pump for pushing air into the flexible bag to send some puree in the horse's mouth can be integrated into a stick or a grip 400 that the rider can hold in his hand. The stick or grip 400 may include a strap. In one embodiment it has a length less than 15 cm, for example between 5 and 10 cm. It is connected to a pipe 40 which has enough gap to allow the rider to move the hands forward or back on the reins. As illustrated in FIG. 4B, the pipe can be attached on the reins 500 by the rider, according to the type of ride and according to the size of the bridle.

In this case the rider has the same feeling of holding a whip or a stick, but for rewarding the horse. The rider can press on the button 404 of the stick or grip 400 which sends some air into the flexible bag to push the substance into the mouth of the horse. In another variant, the rider by pressing the stick can send a signal to send the substance in the mouth of the horse. In another embodiment, illustrated in FIG. 4B, the same rod 400 comprises the reservoir of the puree substance and the rider can send this substance in the horse's mouth just by pressing the stick 400 or on its base 404.

Figure 8:
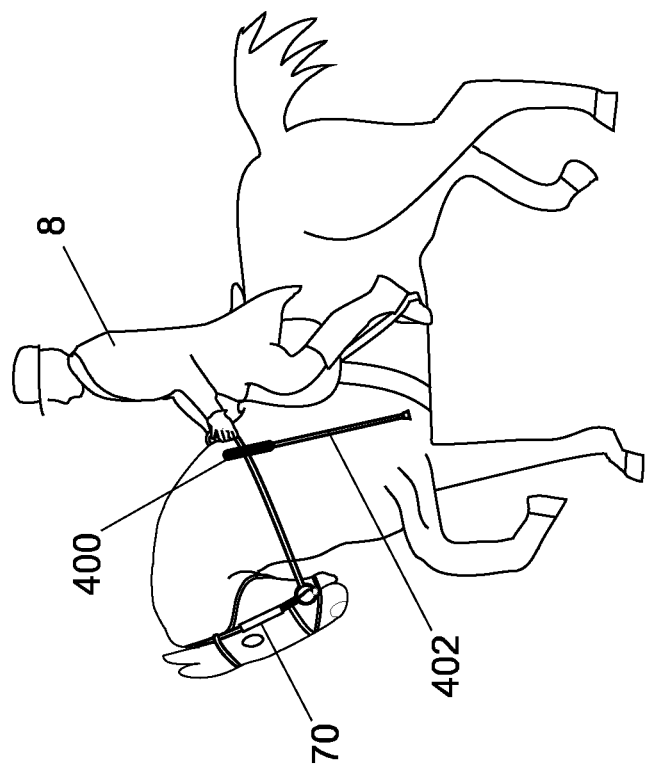
FIG. 8 illustrates a rider who fixed the whip of FIG. 7 to the bridles.
Figure 7:
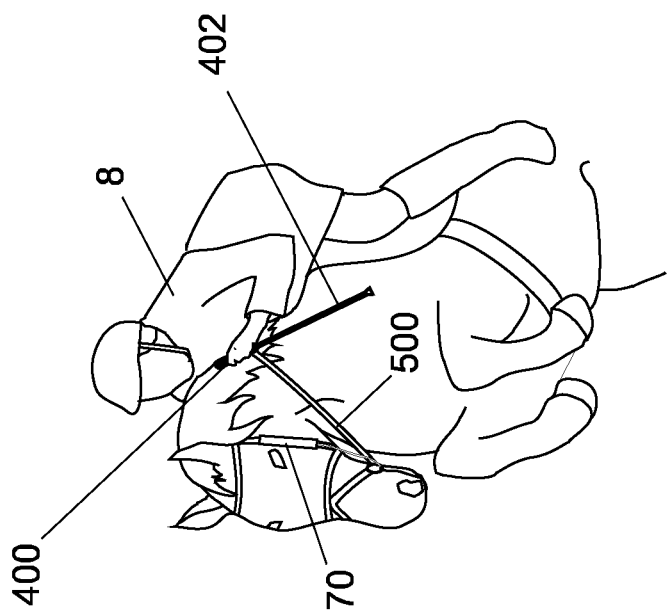
FIG. 7 illustrates a rider rewarding its horse using a stick belonging to a whip according to one embodiment of the invention.

In another variant, shown for example in FIGS. 7 and 8, this stick 400 is mounted as an extension of a whip 402, for example by screwing it onto the stick 402 or by connecting it to the stick 402 through other connection means, by way of non limiting examples through a clipping system, magnets, etc.

In another variant the rod 400 is provided as a small and lightweight system for easy attachment on the reins 500 if the rider 8 no longer wants to use it, with e.g. a notch or a magnetized part, as illustrated in FIG. 8.

In the preferred embodiment of FIG. 4B, a first reservoir, e.g. a syringe 70 fixed to the portion of the bridle 506 exceeding the headpiece in the direction of the mouth with a fixation button B, sends in a passive way, i.e. without action from the user, for example by exploiting the gravity force, a liquid substance L to activate the horse salivation. A second reservoir, for example the rod 400 which can be held by the hand of the rider, will send actively, i.e. through an action of the user, who has for example to press the base 402 of the rod 400, to send a viscous substance V or a mashed mixture to reward the horse.

In this variant the pipe 42 which links the rod 400 to the bit 1 according to the invention and the pipe 44 which connects the syringe 70 to the same bit can be connected to a Y-shaped part illustrated in FIG. 5, to send through the bit 1 two different substances from two different reservoirs. In this way the two substances are mixed before being sent into the mouth of the animal. In another variant, it is possible to send in the bit 1 two substances L and V from two different reservoirs through both mouthpieces 10, which are used one for the first substance L and the other for the second substance V.

According to another independent aspect of the invention, the bit 1 according to the invention or any other bit may be preheated to make it readily accepted by the horse by a heater housing. The bit indeed are generally metallic and therefore they can be very cold to a horse, especially in winter.

Advantageously this heating unit can have the form of a bit. In a variant it is provided with a switch that activates the heating of the bit during the preparation of the horse. The heating can be obtained for example and in a non-limiting way by a heating resistance. In another alternative the heating is switched on when the user puts the bit into the housing. In another variant the triggering of the heater can be controlled by a mobile user, such as a smartphone, which provides a trigger signal through a wireless connection to the housing. In another embodiment, the housing may contain two or more bits. In another alternative the housing is cleanable and can be equipped with wipes, e.g. paper wipes, or any other way to keep the bit clean and dry.

REFERENCE NUMBERS USED IN THE FIGURES

1 Bit
2 Horse
8 Rider
10 Mouthpiece
12 End ring-shaped of the mouthpiece
20 Ring
22 Piece in the form of a circular arc
30 Hole
40 Pipe between the bit and the reservoir
50 Connection between the bit and the pipe
60 Connection between the pipe and the reservoir
70 Reservoir
72 Viscous and/or liquid substance
74 Metallic Piece
76 Rod
80 Bridle
90 Means for fixing the reservoir to the bridles
100 Channel
102 Notch
200 Hole for the ring 20
220 Hull-shell
300 Central part of a double jointed bit or central medallion
400 Stick or grip handle
402 Base of the stick
500 Reins
504 Strap fixed to the headpiece
506 Cheek piece
740 Hole of metal piece
R External Reservoir
L Liquid substance
V Viscous substance
L+V Liquid substance and viscous substance

The invention claimed is:

1. Bit including at least two mouthpieces, characterized in that at least one mouthpiece comprises one or several channels extending longitudinally through said mouthpiece from one end to the other end so as to allow the sending of one or more viscous and/or liquid substances directly in the middle of the mouth of an animal,
wherein said at least one mouthpiece comprises at least one notch configured to avoid the occlusion of said channel.

2. The bit according to claim 1, including at least one piece in the form of a circular arc not passing through said mouthpiece so as to connect said bit to horse bridles.

3. The bit according to claim 1, including at least one piece in the form of a circular arc and passing through said mouthpiece below or above said channel.

4. The bit according to claim 1, configured to be connected to a reservoir of said viscous and/or liquid substance through a pipe, the connection between said bit and said pipe and/or the connection between said pipe and said reservoir being non-standard.

5. The bit according to claim 1, being made of at least one of the following materials: metal, rubber, synthetic materials, plastic, alloy.

6. System for sending liquid and/or viscous substances in the mouth of an animal, comprising:
a bit according to claim 1;
one or more reservoirs of the viscous and/or liquid substances; and one or more pipes between said bit and said one or more reservoirs.

7. The system according to claim 6, the connection between said bit and said pipes and/or the connection between said pipes and said reservoirs being non-standard.

8. The system according to claim 6, comprising means for automatically applying pressure in one of the reservoirs on said viscous and/or liquid substance, so as to send said viscous and/or liquid substance into the mouth of the animal.

9. The system according to claim 8, said means for automatically exerting pressure comprising a metal piece in the reservoir, said metal piece moving under the effect of its own weight.

10. The system according to claim 9, said reservoir constituting the body of a syringe.

11. The system according to claim 10, said metal piece, once arrived at one end of said syringe under the effect of its own weight, can be moved by a user to the other end of said syringe.

12. The system according to claim 10, said syringe body being configured in a way that allows it to be disconnected from said pipe and to be connected to an external reservoir in order to fill said syringe body again when the user displaces said metal piece into the direction of the other end of said syringe.

13. The system according to the claim 8, said means for automatically exerting pressure comprising an elastically compressible element in the reservoir.

14. The system according to the claim 13, said compressible element being a spring and/or gas and/or silicone.

15. The system according to the claim 6, wherein:
a first reservoir of the reservoirs contains a liquid substance;
a second reservoir of the reservoirs contains a viscous substance; and
said pipe comprises a Y-shaped part, so as to send into said bit said liquid substance mixed with said viscous substance.

16. The system according to claim 6, comprising:
a first reservoir of the reservoirs containing a liquid substance; and
a second reservoir of the reservoirs containing a viscous material and/or purees; wherein:
said first reservoir is connected to a first mouthpiece of said bit through a first pipe;
said second reservoir is connected to a second mouthpiece of said bit through a second pipe;
said first reservoir comprises means to supply in a passive or automatic way said liquid substance in the horse's mouth through said first pipe; and
said second reservoir contains means for sending said viscous substance and/or puree actively into the horse's mouth through said second pipe.

17. The system according to the claim 16, said second reservoir comprising a rod and/or a double-sheeted bag.

18. The system according to the claim 17, comprising a whip-like stick, comprising said rod.

19. The system according to claim 17, wherein said rod is attachable to reins.

20. The system according to claim 16, wherein said first reservoir is fixed to a part of a bridle exceeding the headpart towards the mouth.

21. The system according to claim 6, comprising at least one lockable rod which conforms to the shape of a channel to prevent the occlusion of the channel while the bit is not used and/or to clean said channel.

22. The system according to claim 6, comprising a heater housing for preheating the bit so that it can be easily accepted by the horse.

* * * * *